US010309531B2

(12) United States Patent
Trent

(10) Patent No.: US 10,309,531 B2
(45) Date of Patent: Jun. 4, 2019

(54) CONTINUOUS VARIABLE TRANSMISSION WITH MECHANICAL LOCK

(71) Applicant: Ford Global Technologies, LLC, Dearborn, MI (US)

(72) Inventor: James Trent, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 15/385,004

(22) Filed: Dec. 20, 2016

(65) Prior Publication Data

US 2018/0172148 A1 Jun. 21, 2018

(51) Int. Cl.
| | |
|---|---|
| F16H 9/18 | (2006.01) |
| F16H 61/66 | (2006.01) |
| F16H 63/06 | (2006.01) |
| F16H 63/34 | (2006.01) |
| F16H 61/662 | (2006.01) |

(52) U.S. Cl.
CPC ............ *F16H 61/662* (2013.01); *F16H 9/18* (2013.01); *F16H 63/34* (2013.01); *F16H 61/66* (2013.01); *F16H 63/06* (2013.01)

(58) Field of Classification Search
CPC ... F16H 61/665272; F16H 2061/66295; F16H 55/56; F16H 9/18; Y10T 477/624
USPC .......................................................... 474/8
See application file for complete search history.

(56) References Cited

U.S. PATENT DOCUMENTS

| | | | | |
|---|---|---|---|---|
| 4,813,921 | A * | 3/1989 | Dianda ...................... | F02N 3/04 474/133 |
| 5,931,884 | A * | 8/1999 | Ochiai ............. | F16H 61/66259 477/101 |
| 6,129,643 | A * | 10/2000 | Tamagawa .............. | F16H 55/56 474/10 |
| 6,336,880 | B1 * | 1/2002 | Agner ............... | F16H 61/66263 474/18 |
| 6,585,613 | B1 * | 7/2003 | Walter ...................... | F16H 9/18 474/70 |
| 6,602,163 | B2 * | 8/2003 | Tamura ............. | F16H 61/66254 477/37 |
| 7,001,293 | B2 * | 2/2006 | Lubben ................... | F16C 25/06 384/519 |
| 7,264,564 | B2 * | 9/2007 | Walter .................... | F16H 55/56 474/18 |
| 8,109,847 | B2 * | 2/2012 | Reuschel ................ | F16H 55/56 474/18 |
| 9,222,579 | B2 * | 12/2015 | Tsuji ...................... | F16H 55/56 |

* cited by examiner

*Primary Examiner* — Henry Y Liu
(74) *Attorney, Agent, or Firm* — David Kelley; Brooks Kushman P.C.

(57) ABSTRACT

A vehicle includes a continuously-variable transmission (CVT) that is supplied with power from an input. The CVT also includes a pair of pulleys, at least one of which having a variator that is configured to translate linearly along an axis of the input. A mechanical lock is configured to selectively lock the input with the variator such that the input and the variator rotate in unison. This allows the hydraulic pressure supplied to the CVT to reduce while the variator and the input remain locked.

13 Claims, 2 Drawing Sheets

CONTINUOUS VARIABLE TRANSMISSION WITH MECHANICAL LOCK

TECHNICAL FIELD

This disclosure relates to a continuously-variable transmission (CVT) with a mechanical lock. In particular, the CVT includes an input, a variator, and a mechanical lock for locking the input and the variator together.

BACKGROUND

Continuously-variable transmissions (CVTs) are known in the art. CVTs include a primary pulley that provides a driving force to a belt, which transfers power to a secondary pulley, which drives an output of the transmission. Each pulley includes a pair of plates with a variable distance therebetween. When the distance increases and decreases, the operational characteristics (e.g., speed) of the belt changes, thereby altering the effective input-to-output gear ratio of the CVT. Movement of these plates is possible due to a supply of hydraulic pressure.

SUMMARY

According to one embodiment, a continuously-variable transmission (CVT) includes an input extending along an axis, and a variator disposed about the axis and configured to translate along the axis with respect to the input. A mechanical lock is configured to selectively lock the input with the variator.

The mechanical lock, when engaged, locks the input with the variator such that the input and the variator rotate in unison with the same rotational speed.

The mechanical lock can include a rocker arm configured to pivot into a cavity to lock the input to the variator. The rocker arm can pivot with respect to the input.

In another embodiment, a method of operating a continuously-variable transmission in a vehicle is provided. First, an effective input-to-output ratio of the CVT is increased. Then, an input shaft is mechanically locked to a variator of the CVT. Then, line pressure in the CVT is reduced while the input shaft is mechanically locked to the variator.

In another embodiment, a vehicle includes a CVT having an input and a variator configured to translate along a portion of the input. A mechanical lock is configured to selectively lock the input to the variator. At least one controller is programmed to engage the mechanical lock and reduce line pressure in the CVT while the input is mechanically locked to the variator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
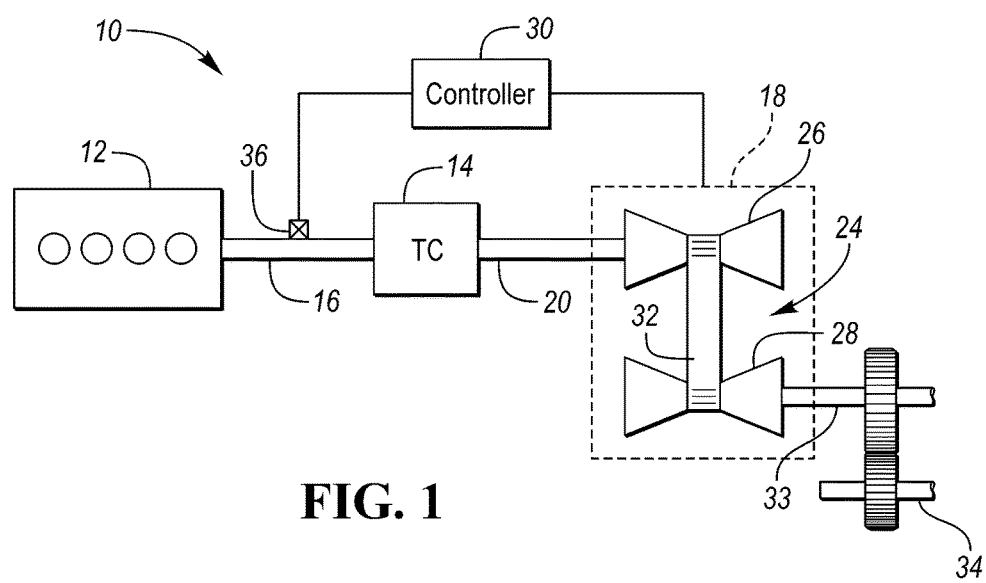
FIG. 1 is a schematic of a vehicle with a CVT, according to one embodiment.

FIG. 1 is a schematic illustration of a transmission control system in a vehicle 10. FIG. 1 is but one possible arrangement of a powertrain and transmission in the vehicle, and it should be understood that the arrangement illustrated in FIG. 1 is merely exemplary. For example, the vehicle may be a hybrid electric vehicle (HEV) or a battery electric vehicle (BEV) in which a separate motor/generator is provided in the powertrain, or in which the engine is removed and substituted with a large battery and electric motor/generator. However, in all embodiments, a continuously variable transmission (CVT) is provided, which will be described in further detail below.

In the embodiment illustrated in FIG. 1, an internal combustion engine 12 is coupled to a torque converter 14 via a crankshaft 16. The torque converter 14 is, in turn, coupled to a transmission 18 via a turbine shaft 20, which can also be referred to as a transmission input shaft. The torque converter 14 may have a bypass clutch (not shown) which can be engaged, disengaged, or partially engaged. When the bypass clutch is disengaged, torque flows through the torque converter 14 before traveling to the transmission 18. When the bypass clutch is engaged, torque bypasses the torque converter 14 and flows directly to the transmission 18.

The transmission 18 includes a CVT 24. The CVT 24 can include a primary pulley 26, which can also be referred to as a driving pulley or an input pulley. The CVT can also include a secondary pulley 28, which can also be referred to as a driven pulley or an output pulley. The primary pulley 26 has a first radius or input radius $R_i$ and the secondary pulley 28 has a second radius or output radius $R_o$. The input radius $R_i$ is controllably adjusted relative to the output radius $R_o$ via a controller 30. To adjust the radii, the controller 30 can provide signals to a hydraulic pressure source to move respective rotating plates of the primary pulley 26 relative to the secondary pulley 28. For example, the distance between the two plates of the primary pulley 26 can be moved closer and further from one another, causing the two plates of the secondary pulley 28 to move further and closer from one another, respectively. This changes the path of movement and the winding radius of the belt 32, thereby altering the effective transmission ratio. Thus, a continuously variable transmission gear ratio can be provided from the shaft 20 to a transmission output shaft 33, which can be coupled to a drive axle 34 via a gearing arrangement. In one embodiment, the drive axle 34 transfers the driving power to a differential (not shown).

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls the CVT 24 in response to signals from various sensors that will be described below. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The controller 30 may include a computer that is specifically programmed to perform the exemplary actions detailed below, as opposed to a general purpose computer.

Both the primary and secondary pulleys 26, 28 can be equipped with pulley speed sensors (not shown), which provide signals to the controller 30 for determining transmission ratio. Further, an engine-speed sensor 36 can be provided. The engine-speed sensor 36 is specifically configured to determine the rotating speed of the engine. The vehicle 10 also includes wheels (not shown) with associated wheel-speed sensors that are each configured to detect the rotational speed of its respective wheel. The wheel-speed sensors can collectively allow the controller 30 to determine a speed of the vehicle, according to known methods. The controller 30 receives input signals containing data from these sensors and other sensors to command an effective operating ratio of the CVT 24.

Figure 2:
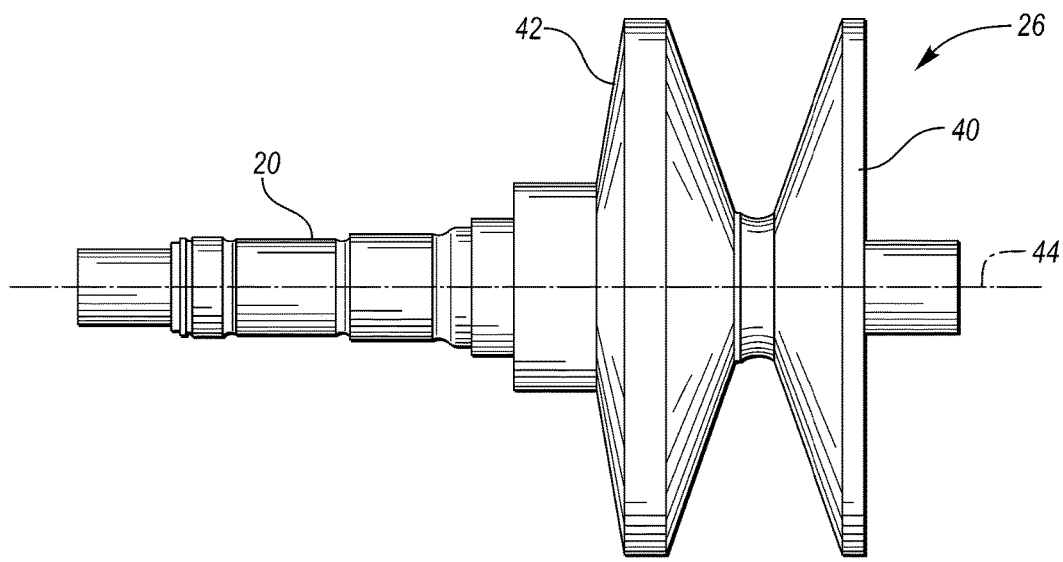
FIG. 2 is a side view of a pulley of the CVT, according to one embodiment.
Figure 3:
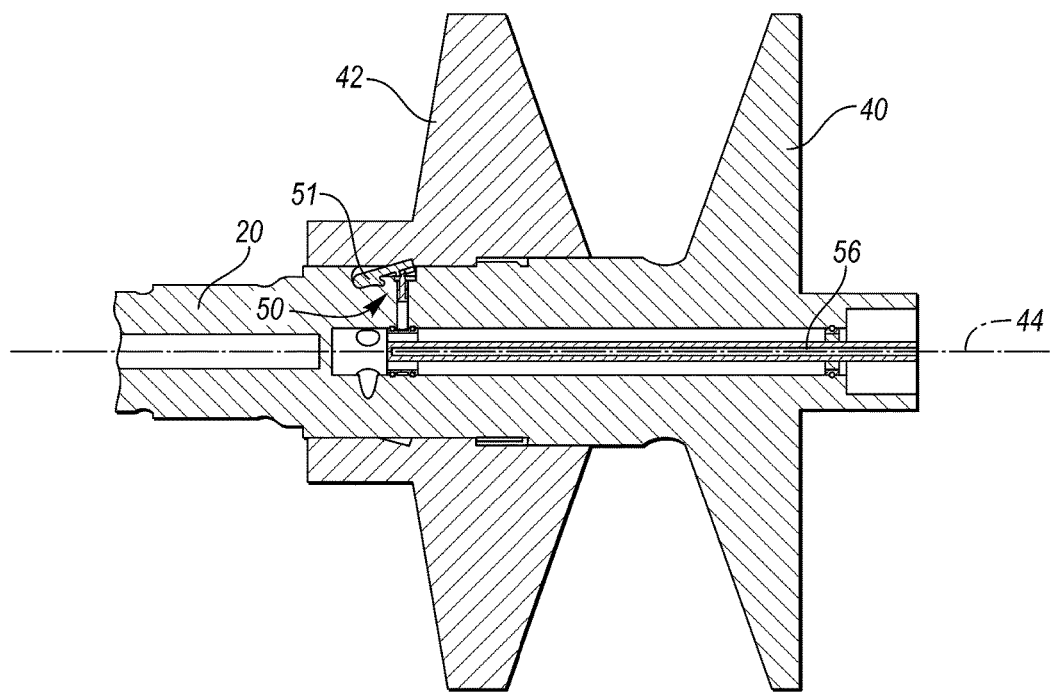
FIG. 3 is a cross-sectional view of the pulley of the CVT with a mechanical lock in an engaged position, according to one embodiment.
Figure 4:
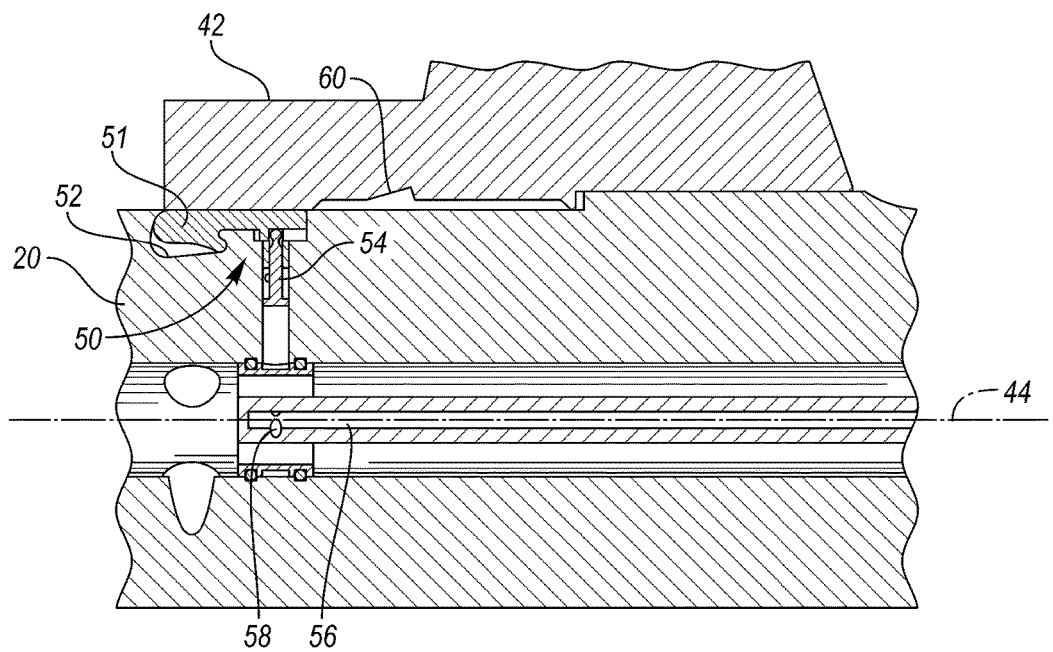
FIG. 4 is an enlarged cross-sectional view of the pulley of the CVT with the mechanical lock in a disengaged position.

FIGS. 2-4 show various views of the primary pulley 26 and portions thereof. FIG. 2 is a side view of the primary pulley 26. The primary pulley 26 includes a pair of disks 40, 42. One of the disks 40 is part of (or fixed with respect to) the input shaft 20. The other disk 42 can be referred to as a variator. As explained above, hydraulic pressure (for example) can be used to translate the variator along the central axis 44 with respect to the input shaft 20. This can widen or shorten the distance between the two disks 40, 42 to change the operating characteristics of the belt 32 and thereby the effective operating gear ratio of the CVT. For example, FIG. 2 shows the disks 40, 42 in a first arrangement and FIG. 3 shows the disks 40, 42 in a second arrangement in which the disks 40, 42 are further apart from one another (i.e., the variator 42 has translated to the left).

To move the variator 42 and maintain the variator 42 in any position, the CVT must be able to supply sufficient hydraulic line pressure for operation at any speed. When the CVT is operating at high speeds and with a high effective gear ratio, a relatively large amount of hydraulic line pressure must be available. However, with higher line pressure comes a decrease in transmission efficiency and fuel economy.

According to various embodiments of the present disclosure, the CVT 24 is equipped with a mechanical lock configured to lock the input shaft 20 with the variator 42. As will be explained, the mechanical lock can lock the input shaft 20 with the variator 42 when the CVT is operating at a relatively high effective gear ratio. When engaged, the mechanical lock allows the hydraulic line pressure supplied to the CVT 24 to decrease without the input shaft 20 and variator 42 becoming unlocked. This increases transmission efficiency and fuel economy.

One embodiment of the mechanical lock 50 is shown in FIGS. 3-4. The mechanical lock 50 may include a rocker arm or rocker 51 housed within a cavity or pocket 52 defined within the input 20. The pocket 52 has a profile larger than that of the rocker 51, allowing the rocker 51 to pivot within the pocket 52. The mechanical lock 50 may be actuated by an actuator 54, which is translatable to and from the central axis 44. In one embodiment, the actuator 54 is supplied with hydraulic fluid from a feed line 56 ending in holes 58 to allow hydraulic fluid to act on an underside of the actuator 54 and press the actuator away from the central axis 44. Movement of the actuator 54 away from the axis 44 cause the rocker 51 to pivot into engagement with the variator 42.

The variator 42 is provided with a corresponding cavity or pocket 60 to receive the rocker 51 when actuated by the actuator 54. The pocket 60 may be positioned or located along the variator 42 at a location such that pivoting of the rocker 51 into the pocket 60 can only be accomplished when the disks 40, 42 are at or near their furthest distance apart. This allows the mechanical lock 50 to only engage when the CVT is operating with a relatively high effective gear ratio. In one embodiment, the pocket 60 is located such that the mechanical lock 50 is only able to lock the input 20 with the variator 42 when the CVT is operating in an overdrive ratio, e.g., when the disks 40, 42 have a maximum allowable distance therebetween.

FIG. 4 shows the rocker 51 in its retracted position such that the input 20 is not mechanically locked with the variator 42. FIG. 3 shows the rocker 51 pivoted to its extended position and into the variator 42, locking the variator 42 with respect to the input shaft 20. This allows the hydraulic fluid supplied to the CVT 24 to drop or reduce while the mechanical lock 50 is locked, improving fuel economy and CVT efficiency.

While not shown, the secondary pulley 28 can include similar structure as the primary pulley 26, such as a pair of disks, one of which being a variator to adjust the distance between the disks, and the other of which being an output of the CVT. In one embodiment, only the primary pulley 26 is provided with the locking mechanism, although other embodiments the secondary pulley 28 is also provided with a locking mechanism.

The controller 30 or one or more other controllers can be electrically coupled to the fluid source that supplies hydraulic fluid to the actuator 54 via the feed line 56. This controller can be programmed to operate the mechanical lock when the CVT is operating at or near its over drive ratio while the vehicle is at relatively high speeds (e.g., highway speeds). In operation, the controller and/or other controllers in a network may be programmed to increase an effective input-to-output ratio of the CVT by translating the variator 42 with respect to the input 20. Once an effective ratio exceeding a threshold has been met (e.g., the CVT is operating in an overdrive ratio), the controller can supply hydraulic fluid to the actuator 54, causing the rocker 51 to pivot into engagement with the pocket 60 of the variator 42, thereby mechanically locking the variator 42 with the input 20. With the mechanical lock engaged and locked, the controller can reduce the overall hydraulic pressure supplied to the CVT 24 without altering the distance between the plates 40, 42. Thereafter, in response to a lower vehicle speed or a desired reduction in effective ratio of the CVT, the hydraulic fluid pressure can increase to a pressure sufficient to control and hold the plates 40, 42, the mechanical lock 50 can be disengaged, and the hydraulic pressure supplied to the CVT can be reduced to move the variator 42 with respect to the input 20 to reduce the effective ratio of the CVT.

While not shown in the Figures, the secondary pulley 28 may be provided with springs (e.g., Belleville washers) configured to provide an axial load on the variator of the secondary pulley when the input 20 is locked to the variator 42 in the primary pulley 26. In one embodiment, the Belleville washers (or other springs) are provided radially outward from the central shaft of the variator of the secondary pulley 28. The axial load provided by these springs provides belt tension with the belt 32. The springs can provide axial force even if there is misalignment from machining in the engagement between the variator 42 and the rocker 51 of the primary pulley 26. The springs are set up with a safety of factor so that they will provide enough force to carry belt tension even if the variator 42 of the primary pulley 26 is not fully stroked. In one embodiment, the springs only start to provide axial force when the variator of the secondary pulley 28 is away from is mating plate (this occurs in lower gear ratios and in overdrive).

It should be understood that the mechanical lock can provide a mechanical connection and locking force between the variator and the input. This is not the same as simply supplying sufficient hydraulic fluid to the CVT to hold the variator and input in position. One of ordinary skill in the art should appreciate and understand that the term "mechanical lock" or "locking device" refers to an additional component outside of the mere supply of hydraulic fluid to the CVT to maintain alignment between the variator and the input.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A continuously-variable transmission (CVT), comprising:
   an input extending along an axis;
   a variator disposed about the axis and configured to translate along the axis with respect to the input; and
   a mechanical lock configured to selectively lock the input to the variator, wherein the mechanical lock includes a rocker arm configured to pivot into a cavity to lock the input to the variator.

2. The CVT of claim 1, wherein the rocker arm pivots with respect to the input and the cavity is defined within the variator.

3. The CVT of claim 1, wherein the mechanical lock is disposed radially between the input and the variator.

4. The CVT of claim 1, wherein the mechanical lock is housed within a pocket defined in the input, and is partially moveable out of the pocket when locking the input to the variator.

5. The CVT of claim 1, further comprising an actuator configured to engage the mechanical lock to lock the input to the variator, and an oil line in the input configured to supply oil to the actuator to engage the mechanical lock.

6. The CVT of claim 5, wherein the actuator is configured to linearly translate within the input to engage the mechanical lock in response to pressure from the oil line.

7. The CVT of claim 1, further comprising a secondary shaft extending along a secondary axis, a secondary variator disposed about the secondary axis, a belt configured to transfer rotational power from the input to the secondary shaft, and a spring configured to provide an axial load on the secondary variator when the input is locked to the variator.

8. A vehicle comprising:
   a continuously-variable transmission (CVT) having an input and a variator configured to translate along a portion of the input;
   a mechanical lock configured to selectively lock the input to the variator; and
   at least one controller programmed to engage the mechanical lock and reduce line pressure in the CVT while the input is mechanically locked to the variator.

9. The vehicle of claim 8, wherein the at least one controller is further programmed to engage the mechanical lock in response to the CVT operating in an overdrive ratio and a speed of the vehicle exceeding a speed threshold.

10. The vehicle of claim 8, wherein the mechanical lock is a rocker configured to selectively pivot into engagement with the variator to mechanically lock the variator to the input.

11. The vehicle of claim 10, wherein the variator includes a pocket defined therein for receiving the mechanical lock, the pocket being located at an axial location along the variator such that the rocker can be received within the pocket only when the CVT is operating at an overdrive ratio.

12. The vehicle of claim 8, further comprising an actuator configured to engage the mechanical lock to lock the input to the variator, and an oil line configured to supply oil to the actuator to engage the mechanical lock.

13. The vehicle of claim 8, wherein the input and the variator are part of a primary pulley coupled to a secondary pulley having a secondary variator, wherein the secondary pulley includes a spring configured to provide an axial load on the secondary variator while the input is locked to the variator.

* * * * *